(12) United States Patent
Kim

(10) Patent No.: US 8,131,707 B2
(45) Date of Patent: Mar. 6, 2012

(54) METHOD AND APPARATUS FOR PROVIDING SEARCH RESULT USING LANGUAGE CHAIN

(76) Inventor: Dong Arm Kim, Seoul (KR)

( * ) Notice: Subject to any disclaimer, the term of this patent is extended or adjusted under 35 U.S.C. 154(b) by 681 days.

(21) Appl. No.: 12/224,255

(22) PCT Filed: Feb. 2, 2007

(86) PCT No.: PCT/KR2007/000571
§ 371 (c)(1),
(2), (4) Date: Aug. 21, 2008

(87) PCT Pub. No.: WO2007/097531
PCT Pub. Date: Aug. 30, 2007

(65) Prior Publication Data
US 2009/0024620 A1      Jan. 22, 2009

(30) Foreign Application Priority Data
Feb. 21, 2006 (KR) .......................... 10-2006-0016907

(51) Int. Cl.
*G06F 17/30* (2006.01)

(52) U.S. Cl. ........ 707/708; 707/736; 707/706; 707/713; 707/913

(58) Field of Classification Search .................. 707/708, 707/736, 726, 763, 706, 713, 913
See application file for complete search history.

(56) References Cited

U.S. PATENT DOCUMENTS

| 5,745,889 A * | 4/1998 | Burrows ............................... 1/1 |
| 2007/0033112 A1* | 2/2007 | Nagle et al. ..................... 705/26 |
| 2008/0208858 A1* | 8/2008 | Kim et al. ......................... 707/6 |
| 2009/0228481 A1* | 9/2009 | Neale et al. ...................... 707/5 |

FOREIGN PATENT DOCUMENTS

| JP | 10-105578 | 4/1998 |
| KR | 1020010108845 | 8/2001 |
| KR | 1020030091256 A | 3/2003 |
| KR | 1020030033497 A | 5/2003 |
| WO | WO2005/055090 A1 | 6/2005 |

* cited by examiner

*Primary Examiner* — Giovanna Colan
*Assistant Examiner* — Dennis Myint
(74) *Attorney, Agent, or Firm* — Kile Park Goekjian Reed & McManus PLLC

(57) ABSTRACT

Provided is a multiple information retrieval apparatus and method using a language chain to provide directly executable multiple information when a search result regarding a query word is provided. The retrieval apparatus includes: an I/O display window inputting query words; a search button which approves the input query words over the Internet; a search engine database containing information about the query words; a search query word information source having information which sets the query words as a title; a language chain which connects the grouped words with at least one connector; a parsing key for selecting the grouped words, and an image or video display window which can display images or videos using a web-browser. Accordingly, the retrieval apparatus provides multiple domains regarding query words, indices of electronic publishing materials and home page lists.

7 Claims, 15 Drawing Sheets

| KIMCHI POT STEW MATERIALS | | WORD | WEB PAGE CONNECTION INFORMATION | | IMAGE OR VIDEO INFORMATION |
|---|---|---|---|---|---|
| K1 | TITLE | KIMCHI POT STEW MATERIALS | | | |
| D1 | | | | | |
| i1 | K1 | KIMCHI | D1 | i1 | http://www.kimchi.or.kr http://www.kimchi.or.kr/kor/images/type/year/zoom_img/season00_img_L.jpg |
| K2 | | | | | |
| D2 | K2 | PORK | D2 http://www.apgs.co.kr/03_info/06_3.asp | i2 | http://www.apgs.co.kr/images/03_07_2img2.gif |
| i2 | | | | | |
| K3 | K3 | GREEN ONION | D3 | i3 | http://www.webweb.co.kr/imageLib ForImage000000140002000600940030/ SmallImage/40416.jpg |
| D3 | | | | | |
| i3 | K4 | GARLIC | D4 | i4 | http://www.webweb.co.kr/imageLib ForDic/000000030002000010001/ SmallImage/932.jpg |
| ... | | | | | |
| ... | K5 | BEAN CURD | D5 http://www.dubulab.com/ | i5 | http://www.dubulab.com/plus/ma/image/intro-101.gif |
| ... | | | | | |

FIG. 7

| REPUBLIC OF KOREA | | WORD | | WEB PAGE CONNECTION INFORMATION | | IMAGE OR VIDEO INFORMATION |
|---|---|---|---|---|---|---|
| K1 | TITLE | KOREAN CULTURAL ASSETS | | | | |
| D1 | | | | | | |
| i1 | | | | | | |
| K2 | K1 | KOREAN CULTURAL ASSETS | D1 | http://www.mct.go.kr/ | i1 | |
| D2 | | | | | | |
| i2 | K2 | 韓國文化財 | D2 | http://www.mct.go.kr/chinese/index.html | i2 | |
| K3 | K3 | Cultural assets of Korea | D3 | http://www.mct.go.kr/english/index.jsp | i3 | |
| D3 | | | | | | |
| i3 | K4 | 韓國の文化財 | D4 | http://www.mct.go.kr/japan/japan_index.html | i4 | |
| ... | | | | | | |

FIG. 8

| ATOMIC NUMBER 77 | | WORD | | WEB PAGE CONNECTION INFORMATION | | IMAGE OR VIDEO INFORMATION |
|---|---|---|---|---|---|---|
| K1 | TITLE | ATOMIC NUMBER 77 | | | | |
| D1 | | | | | | |
| i1 | | | | | | |
| K2 | K1 | ATOMIC NUMBER 77 | D1 | | i1 | |
| D2 | | | | | | |
| i2 | K2 | 原子番號 77 | D2 | | i2 | |
| K3 | K3 | atomic number 77 | D3 | | i3 | |
| D3 | | | | | | |
| i3 | K4 | 이리듐 | D4 | | i4 | |
| ... | | | | | | |
| | K5 | iridium | D5 | | i5 | |

FIG. 9

| REFRIGERATOR |
|---|
| K1 |
| D1 |
| i1 |
| K2 |
| D2 |
| i2 |
| K3 |
| D3 |
| i3 |
| ... |
| ... |
| ... |

| | WORD | | WEB PAGE CONNECTION INFORMATION | | IMAGE OR VIDEO INFORMATION |
|---|---|---|---|---|---|
| TITLE | REFRIGERATOR | | | | |
| K1 | 냉장고 | D1 | | i1 | |
| K2 | 冷藏庫 | D2 | | i2 | |
| K3 | REFRIGERATOR | D3 | | i3 | |
| K4 | 디오스-DIOS | D4 | http://www.lge.co.kr/ | i4 | |
| K5 | 지펠_Zipel | D5 | http://www.sec.co.kr/ | i5 | |
| K6 | 클라세_KLASSE | D6 | http://www.dwe.co.kr/ | i6 | |
| K7 | 딤체-Dimchae | D7 | http://www.winiamando.com/winia/2006room_list.asp | i7 | |

FIG. 10

| 7294-08-0002-0 |
|---|
| K1 |
| D1 |
| i1 |
| K2 |
| D2 |
| i2 |
| K3 |
| D3 |
| i3 |
| ... |
| ... |
| ... |

| | WORD | | WEB PAGE CONNECTION INFORMATION | | IMAGE OR VIDEO INFORMATION |
|---|---|---|---|---|---|
| TITLE | 7294-08-0002-0 | | | | |
| K1 | KYUNGBOK PALACE HISTORY | D1 | http://www.wisenut.co.kr/query.asp?query=경복궁기행열전&start=0&count=10&opt=1&cluster=2&from=wisenutnew | i1 | http://www.webweb.co.kr/imageLibForImage/000000150005/SmallImage/36278.jpg |
| K2 | KYUNGBOK PALACE | D2 | http://gbg.cha.go.kr/ | i2 | |
| K3 | KWANGHWAMUN CITIZEN OPEN YARD | D3 | | i3 | |
| K4 | SEOUL CHUNGGYECHUN | D4 | | i4 | |
| K5 | JONGRO DISTRICT OFFICE | D5 | http://www.jongno.go.kr/ | i5 | |

METHOD AND APPARATUS FOR PROVIDING SEARCH RESULT USING LANGUAGE CHAIN

TECHNICAL FIELD

The present invention relates to a method and apparatus for providing Internet search result information using a language chain, and more particularly, to a method and apparatus for retrieving data by directly gaining access to a web page in which words connected by at least one connector are displayed on an I/O (input/output) display window, picture or video information included in the words is displayed, and the web page is directly accessed using given connection information in order to provide results regarding query words input to perform a search work by a user.

BACKGROUND ART

Usually, to search desired information or web sites, people can connect to a portal site and input search words in order to search relevant information or web sites.

Here, input query language need not to be words but may be characters or classification numbers.

On the other hand, in the case of the conventional search methods, query words input on a search window are parsed by a word, and then web pages on a web are indexed and displayed using a search method that uses operators of "AND," "OR," "NOT" etc., and similar query words are provided. In addition, correlation between words is calculated on the basis of a history or a collected document, and then several similar words are displayed using a visual method.

In addition, words connected with query words and a word degree of association are provided and a number of referenced relevant words are provided. However, if a relevant word is clicked, the clicked relevant word is searched again to thus progress a search work again. After such relevant words are searched, texts or images which are linked on a web page provided by an ordinary search engine site in the form of a hypertext markup language (HTML) type are selected to thus gain access to a relevant web page.

However, in the above-described conventional art, one web site that a user thinks to be the most similar web site is clicked among the.HTML list after search, to thus gain access to the web site. Accordingly, a majority of clicking times and one time of search are needed. As a result, there is a problem in the conventional art that much time is required because several times of clicks or enter key input processes are needed even if a search window has been maintained.

There is another method of connecting directly with a home page in which a mother language is input on a web browser address window and then collected URL addresses are returned on the address window. However, since a URL address is displayed instead of the input query words, there is a problem that query words cannot be used. Further, since there is a limitation that one word corresponds to one web site, there is a need to improve the conventional search method which is insufficient to gain access to various sub-pages.

Further, in the case of proper nouns, names of goods, registered trademarks, or enterprises that use similar company names, prior occupation of domains may cause a problem of raising an adverse effect that prevents competition in good faith.

Still further, when query words that are input on a search window are foreign language, a search work is performed using special keyboards or words that are found by connection of dictionary web sites on the Internet. However, a lot of times and efforts are needed. In particular, since several pages are opened at the same time to perform a search work, there is a problem that many loads are applied to a computer.

DISCLOSURE OF THE INVENTION

It is an object of the present invention to provide a method and apparatus for providing Internet search result information using a language chain in which words that correspond to query words that are selected through an I/O (input/output) display window are displayed on the I/O display window again, and the Internet search result information which is directly accessed or displayed using web page connection information and image or video information that is included in each word is configured in the form of the language chain.

It is another object of the present invention to provide a method and apparatus for providing Internet search result information using a language chain in which when search words are searched in one language, the search words are also displayed on an identical search window in a corresponding foreign language, to thus search on domestic or foreign web sites without making an effort of inputting foreign-language search words.

It is still another object of the present invention to provide a method and apparatus for providing Internet search result information using a language chain in which information can be intuitively grasped only by words included in the language chain, and if a word included in the words is clicked, a web page located in the uppermost portion of a predetermined list can be accessed.

It is yet another object of the present invention to provide a method and apparatus for providing Internet search result information using a language chain in which if elements of a material are searched, the home page of a company which produces or sells the relevant material can be accessed, web sites or dictionary web sites including information for the relevant material can be accessed.

It is yet still another object of the present invention to provide a method and apparatus for providing Internet search result information using a language chain in which a language chain of goods including symbolic trademark name of the same products is configured to align home pages of companies which produce the same products or introduction pages of goods of companies which provide goods through a search query word information source.

It is a further object of the present invention to provide a method and apparatus for providing Internet search result information using a language chain in which a language chain which is made of a number which is formed by mixing International Standard Book Number (ISBN) codes and page numbers of published materials as a title, extends the contents provided from the published materials and provides the supplemented materials irrespective of the meaning of the title, in order to supplement contents of describing electronic published materials and provide updated information.

To accomplish the above object of the present invention, there is provided a method of providing Internet search result information using a language chain, the method comprising the steps of: a user storing a title and data including a number of words and information to be included in the title in a search engine database, or a user storing a title, an image or view data, and relevant words and connection information directly in the search engine database through an I/O (input/output) display window of a web browser; if query words are received from the search engine database and a search button is pressed, connecting a user's computer including the web browser with the Internet, and detecting a corresponding title;

said search engine database receiving the query words from the web browser through the Internet and detecting a title corresponding to the query words to thus produce a search query word information source, and displaying information contained in the search query word information source on the I/O display window of the web browser through the Internet and the language chain as information included in the respective words; said language chain aligning a starting first word to be located after the last word using a parsing key, or directly selecting words to align the words displayed in front of the selected words to be located after the last words horizontality or vertically; and displaying information relevant with the selected words on an image or video display window, using the information detected in the search query word information source, or directly connecting a web site to be accessed through the Internet.

There is also provided an apparatus for providing Internet search result information using a language chain, the apparatus comprising: an I/O display window inputting query words; a search button which approves the input query words over the Internet; a search engine database containing information about the query words; a search query word information source having information which sets the query words as a title; a language chain which connects the grouped words with at least one connector; a parsing key for selecting the grouped words; and an image or video display window which can display images or videos using a web-browser.

BRIEF DESCRIPTION OF THE DRAWINGS

FIGS. 3A and 3B show a display screen illustrating an example of a connection domain that a user registers and confirms connection information, respectively;

FIG. 5 is a configurational table showing an example of a search query word information source using "Kimchi pot stew materials" as a language chain according to an embodiment of the present invention, in which Kimchi is a Korean traditional food;

FIG. 7 is a configurational table showing an example of a search query word information source containing a mother language and a foreign language according to an embodiment of the present invention;

FIG. 8 is a configurational table showing an example of a search query word information source regarding materials according to an embodiment of the present invention;

FIG. 9 is a configurational table showing an example of a search query word information source containing goods according to an embodiment of the present invention;

FIG. 10 is a configurational table showing an example of a search query word information source containing International Standard Book Number (ISBN) codes and page numbers of published materials;

BEST MODE FOR CARRYING OUT THE INVENTION

Figure 1:
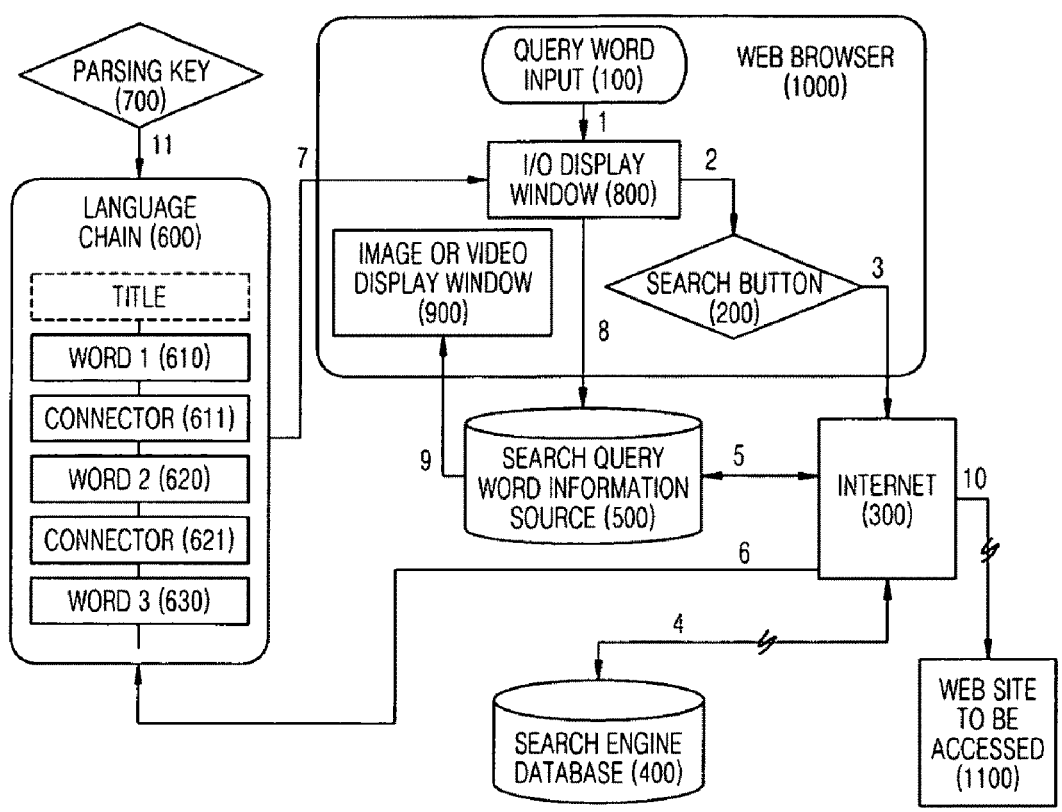
FIG. 1 is a block diagram illustrating an operation of a retrieval apparatus that provides Internet search result information using a language chain according to an embodiment of the present invention.

Hereinbelow, a method and apparatus for providing Internet search result information using a language chain according to a preferred embodiment of the present invention will be described with reference to the accompanying drawings. Like reference numerals are assigned for like elements in the drawings.

Referring to FIGS. 1 through 14, an apparatus for providing Internet search result information using a language chain according to an embodiment of the present invention includes a web browser 1000 connected to a Wide Area Network (WAN) such as the Internet 300, a search query word information source 500, and a search engine database 400. The apparatus according to the embodiment of the present invention also includes a language chain 600 which is connected with the web browser 1000 and the Internet 300, and a parsing key 700, in which the language chain 600 and the parsing key 700 are connected closely with each other.

Referring to FIG. 1, a user stores a title and data including a number of words and information to be included in the title in a search engine database 400, or a user stores a title, an image or view data, and relevant words and connection information directly in the search engine database 400 through an I/O (input/output) display window 800 of a web browser.

If query words are received from the search engine database 400 (line 1) and a search button is pressed (line 2), a user's computer including the web browser 1000 is connected with the Internet 300 (line 3), and a corresponding title is detected (line 3). Here, in the case of a horizontal alignment, the words are connected by at least one connector so as to be divided or in the case of a vertical alignment, the words are longitudinally enumerated to thus use line changes as at least one connector.

The search engine database 400 receives the query words from the web browser 1000 through the Internet 300 (line 4) and detects a title corresponding to the query words to thus produce a search query word information source 500 (line 5), and displays information contained in the search query word information source 500 on the I/O display window 800 of the web browser 1000 through the Internet 300 and the language chain 600 (lines 5, 6 and 7) as information included in the respective words (K1, K2, ..., Kn).

The language chain 600 aligns a starting first word to be located after the last word using a parsing key 700, or directly selecting words (K1, K2, ..., Kn) to align the words (K1, K2, ..., Kn) displayed in front of the selected words (K1, K2, ..., Kn) to be located after the last words (K1, K2, ..., Kn) horizontality or vertically.

Information relevant with the selected words (K1, K2, ..., Kn) are displayed on an image or video display window 900 (line 9), using the information (line 8) detected in the search query word information source 500, or directly connecting a web site 1100 to be accessed through the Internet 300.

Figure 2:
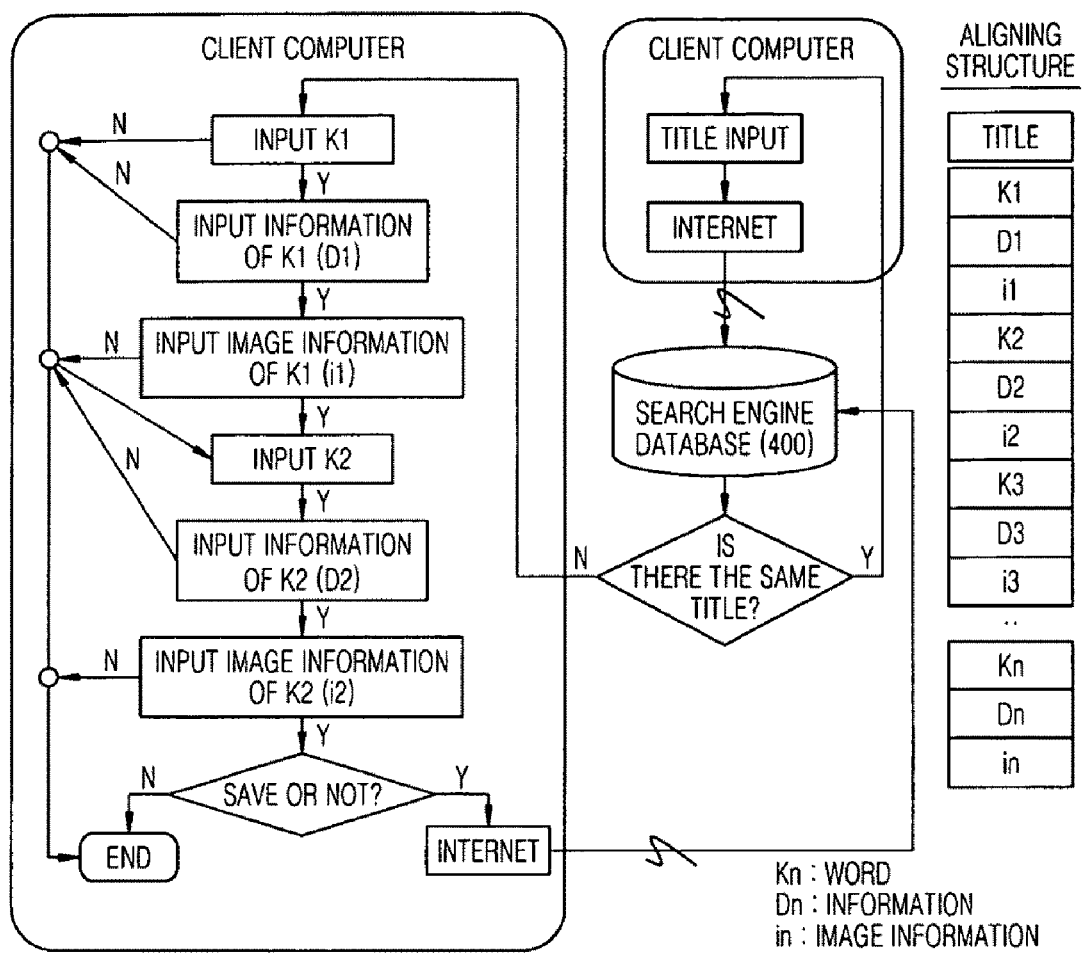
FIG. 2 is a structural diagram showing a structure of inputting and aligning relevant words and image information in a database according to an embodiment of the present invention.

Referring FIG. 2, a title and data including a number of words and information to be included in the title is stored in a search engine database 400, or a title, an image or view data, and relevant words and connection information is stored directly in the search engine database 400 through an I/O (input/output) display window 800 of a web browser.

The search engine database 400 stores a database having a number of threads. The search engine database 400 includes rows which are arranged in a horizontal direction and columns which are arranged in a vertical direction. As is well-known, since the search engine database 400 is configured to have a relational database form, a group of row words (K1, K2, ..., Kn) is selected to then be realigned.

If a user inputs query words 100 through the web browser 1000 and the I/O display window 800 of a client computer, the words (K1, K2, ..., Kn) corresponding to the relevant query words are loaded and simultaneously a site D1 corresponding to the title of the uppermost portion is loaded. In addition, an image ii corresponding to a word K1 corresponding to the relevant title is displayed.

The search query word information source 500 stores the words (K1, K2, ..., Kn) corresponding to search words sequentially, and these words may be overlapped on occasion. In addition, URL or web page information is sequentially or selectively loaded into web page connection information (D1, D2, ..., Dn) in correspondence to the words (K1, K2, ..., Kn), and image information (i1, i2, i3, ..., in) are also sequentially or selectively stored and displayed in correspondence to the corresponding words (K1, K2, ..., Kn) and the URL or web page information (D1, D2, ..., Dn). A flow-chart view illustrated in the left side of FIG. 2 is a flow-chart view illustrating the search query word information source 500 according to an embodiment of the present invention of FIGS. 5, and 7 through 10, which illustrates a process of inputting the words (K1, K2, ..., Kn), the URL or web page information (D1, D2, ..., Dn), and the image information (i1, i2, i3, ..., in) which are displayed on the search window illustrated in FIG. 12A, according to each search word.

Figures 3A, 3B:
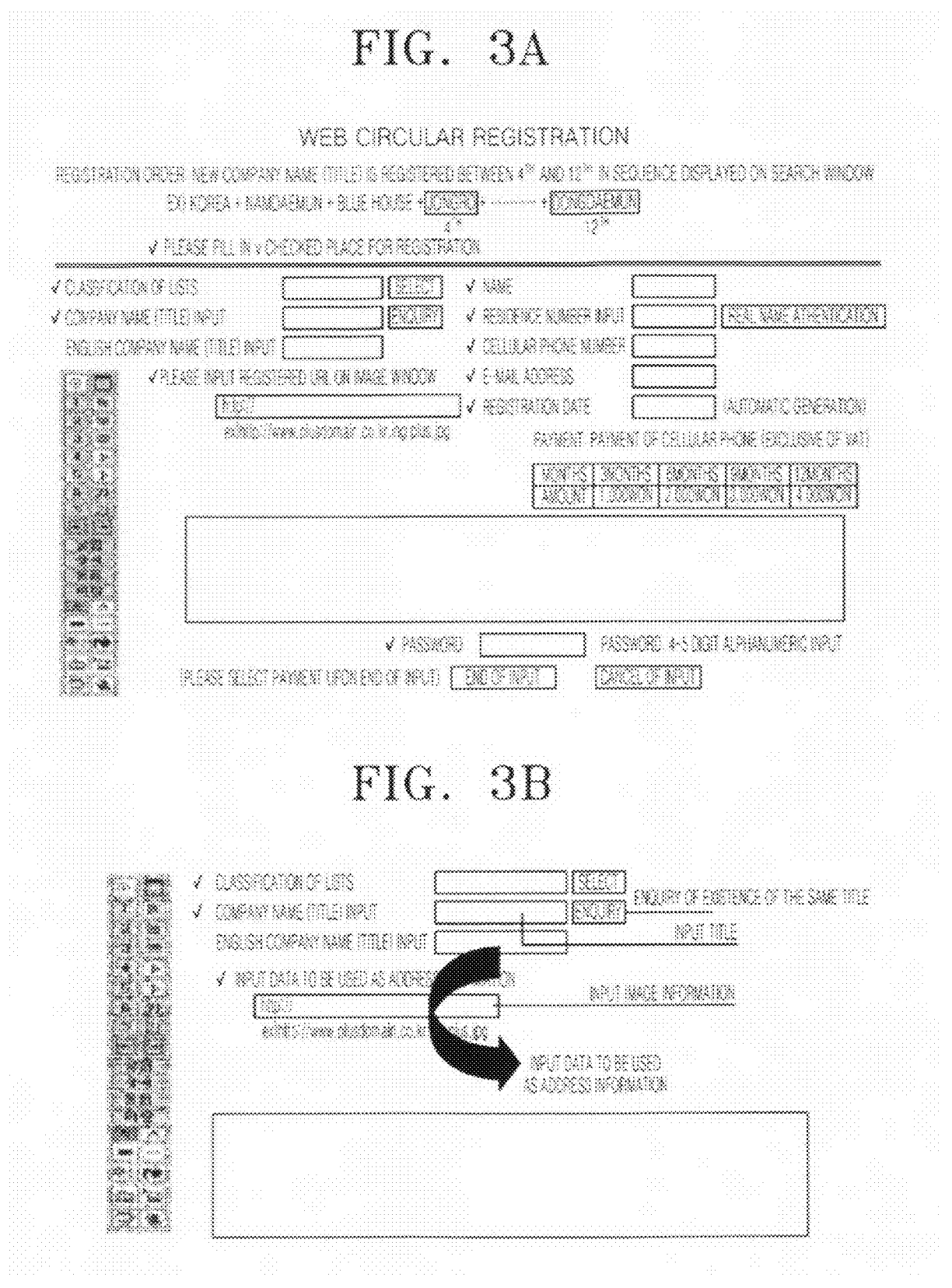

Referring to FIGS. 3A and 3B, a display window for registering and confirming a connection domain at a predetermined position of the language chain 600 is illustrated. Here, web pages are made up so as to be connected when query words are input in the dedicated I/O display window 800 according to the present invention, and the title and word information is input in the search engine database 400. FIG. 3 illustrates an input window through which a web circular can be registered in the search engine database 400 only when a user is authenticated. Here, a legally authenticated user means an existing user, a user who pays a predetermined expense and an administrator.

The web circular means a place where a user can simply uploads his or her own home page information or desired pictures in the search engine database 400. The web circular can be also used in the form of advertisement, public information and a notice board easily.

FIG. 3B is a view illustrating an enlarged left portion of FIG. 3A, in which a portion where a user inputs web pages or URLs, company names, a list category, images and HTML (hypertext markup language) is illustrated in more detail, except for an authentication portion.

Figure 4A:
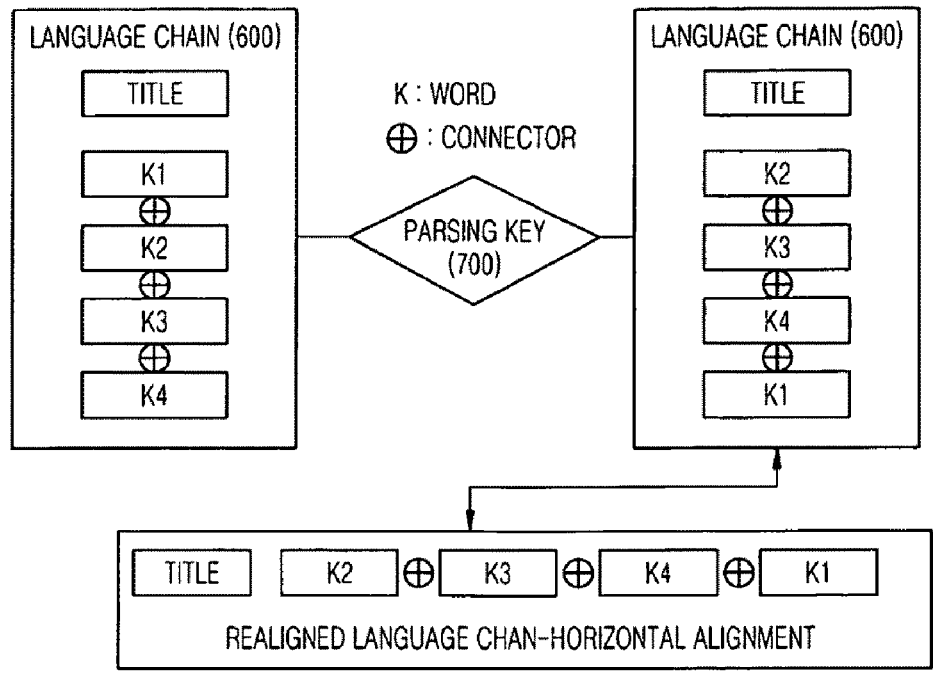
FIGS. 4A and 4B show a display screen illustrating an example of a language chain making query words as a title and a language chain which is rearranged via a word selected using a parsing key according to an embodiment of the present invention, respectively.
Figure 4B:
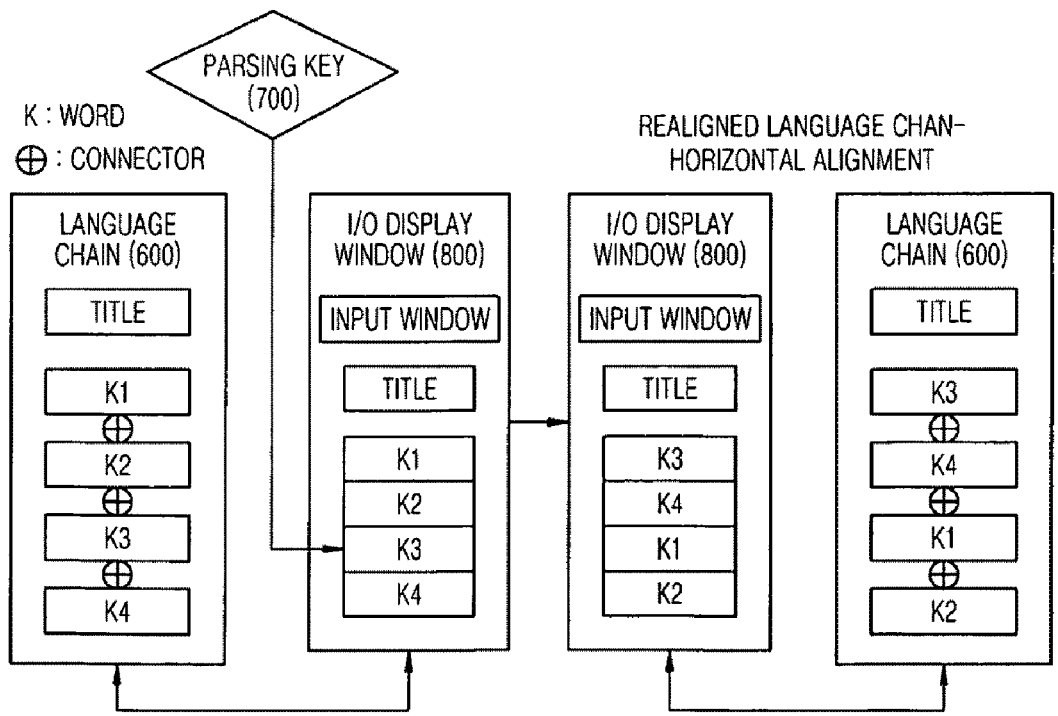
Figure 6:
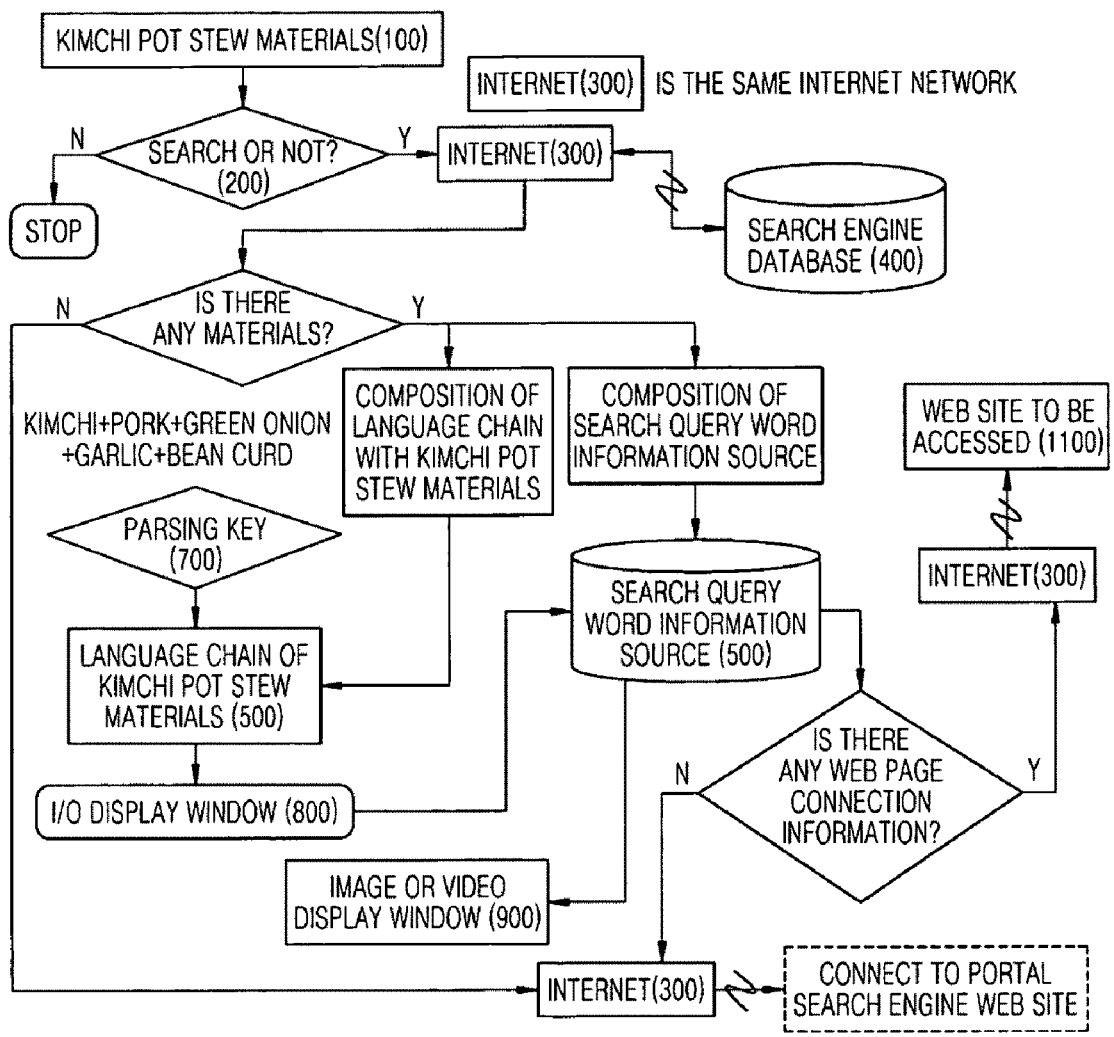
FIG. 6 is a flow-chart view for explaining the whole retrieval process which is performed by inputting "Kimchi pot stew material" on an I/O display window according to an embodiment of the present invention.
Figure 11A:
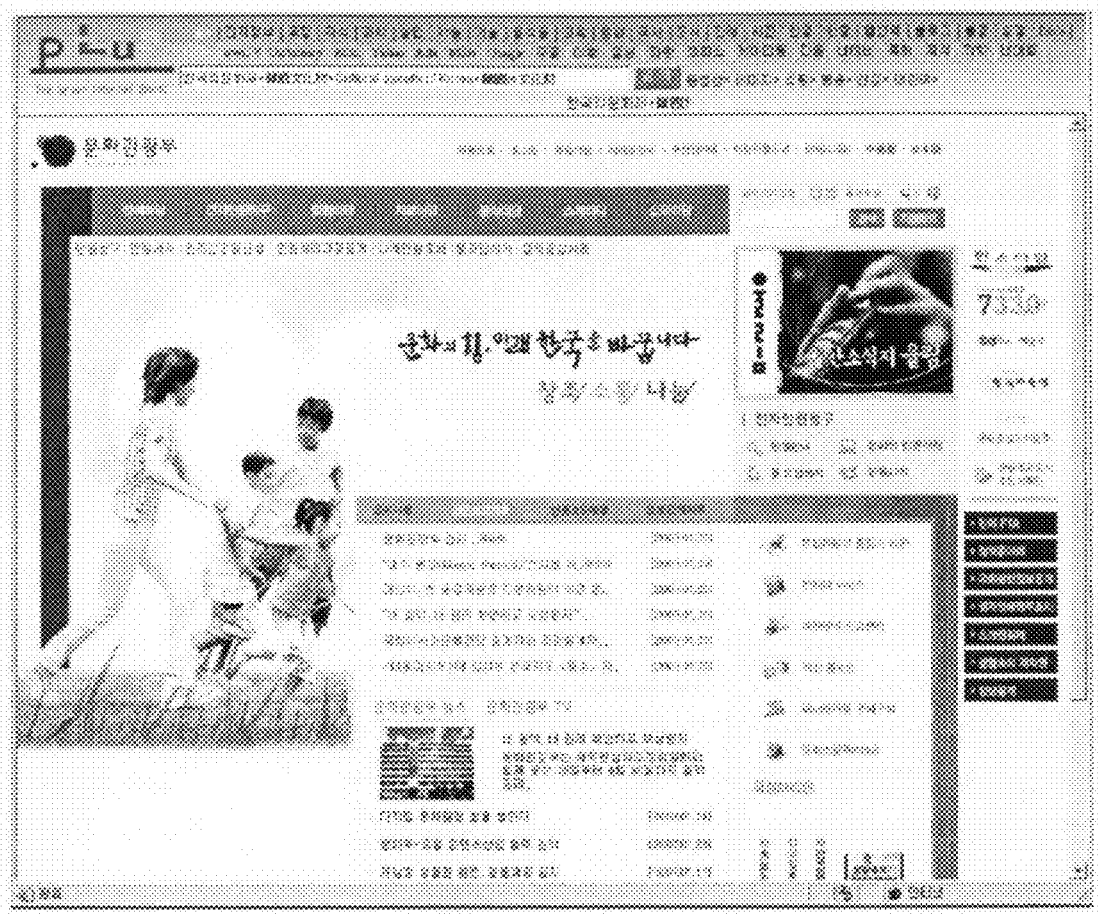
FIGS. 11A through 11D show a display screen illustrating an example of a screen of a web site searched by a sequence of URL connection information when a language chain of FIG. 7 according to the present invention is input on an I/O display window, respectively.
Figure 11B:
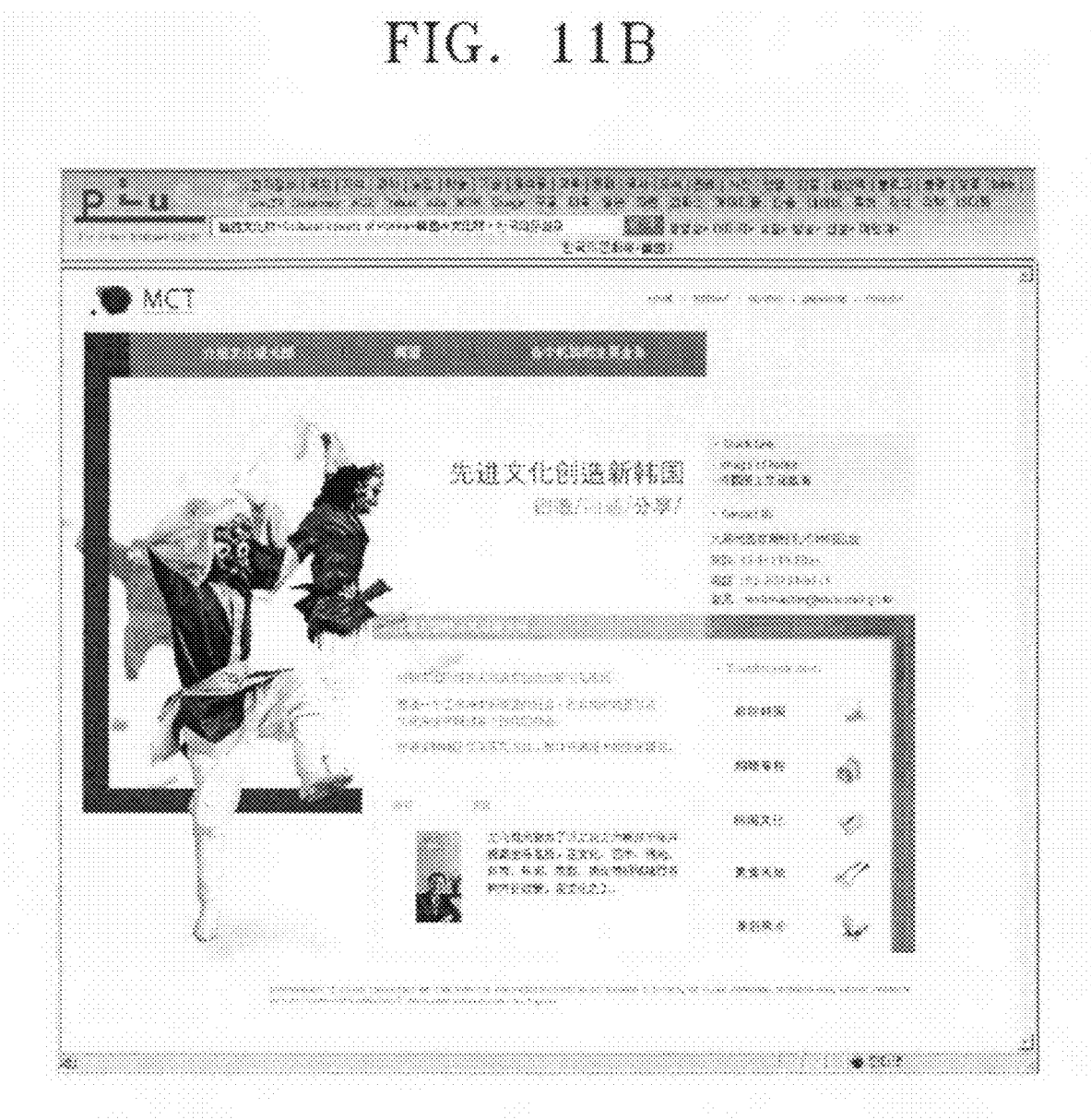
Figure 11C:
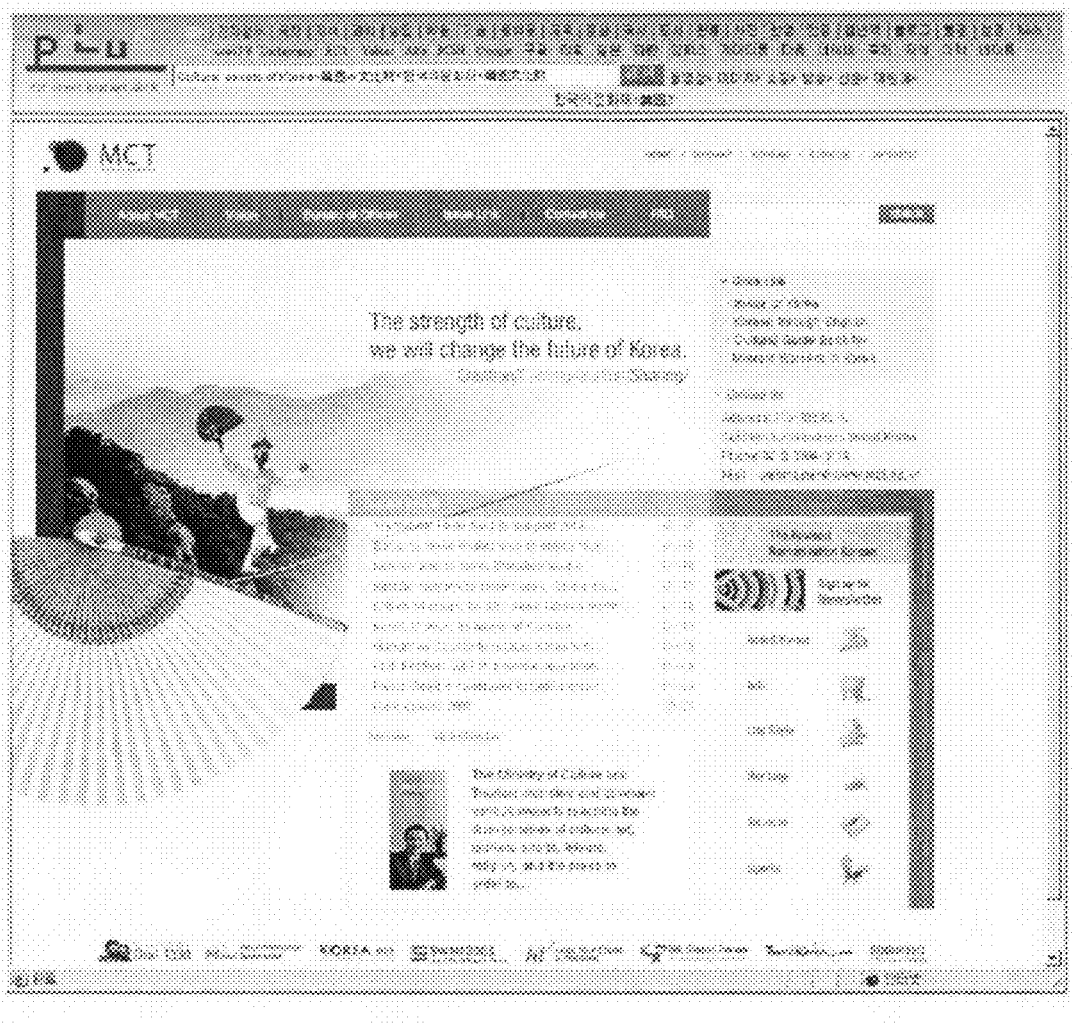
Figure 11D:

Referring to FIGS. 4A and 4B, the search engine database 400 receives the input of the query words 100, and detects titles corresponding to the query words. Here, in the case of a horizontal alignment, the words are connected by at least one connector so as to be divided or in the case of a vertical alignment, the words are longitudinally enumerated to thus use line changes as at least one connector, using a parsing key 700.

As described above, the words (K1, K2, ..., Kn) correspond to the URL or web page information (D1, D2, ..., Dn), and the image information (i1, i2, i3, ..., in). In FIG. 4A, when a particular key which is located in the right side of the I/O display window 800, for example, if a "Plus" key is depressed, in the case of FIG. 12A, the next words (K1, K2, ..., Kn) are displayed. In other words, when a web page corresponding to the K1 word has been displayed, if a "Plus key" is depressed, a web page corresponding to the K2 word is displayed. Since words are sequentially displayed crosswise in FIG. 4A, it is impossible to jump to and click on other words in order to jump over to a corresponding site. Fox example, in order to load a web page corresponding to the K3 word in the K1 word, a site corresponding to the K2 word should be necessarily passed. However, as illustrated in FIG. 4B, if the words searched by the parsing key are aligned longitudinally, corresponding web page information (D1, D2, D3, ..., Dn) and image information (i1, i2, i3, ..., in) can be loaded and displayed by clicking desired words (K1, K2, K3, ..., Kn) by means of a mouse etc.

Moreover, as illustrated in FIG. 4B, the I/O display window 900 can be divided into two windows such as an input window and an output window.

Referring to FIGS. 5, and 7 through 10, a search query word information source 500 is displayed in correspondence to "Kimchi pot stew materials," "Korea's cultural assets," "Atomic number 77," "Refrigerator" and "7294-08-0002-0," respectively.

First, if a search word is input as "Kimchi pot stew materials" in FIG. 5, "Kimchi" corresponding to K1, "Pork" corresponding to K2, "Green onion" corresponding to K3, "Garlic" corresponding to K4 and "Bean curd" corresponding to K5 are displayed in turn horizontally or vertically. That is, the language chain 600 corresponds to "Kimchi pot stew material" as a title in the search engine database 400. The defined words such as "Kimchi," "Pork," "Green onion," "Garlic," and "Bean curd" are connected together using "+" as at least one connector 611 and 621 like "Kimchi+Pork+Green onion+Garlic+Bean curd." Moreover, if the parsing key 700 is selected, "Kimchi" that is a starting word is shifted after "Bean curd" that is the last word, thereby rearranging the words as "Pork+Green onion+Garlic+Bean curd+Kimchi" to then be displayed on the I/O display window 800. Information included in "pork" that is a starting word is extracted. Accordingly, in the case that images or videos exist, the images or videos are displayed on the image or video display window 900. Web page connection information is immediately connected to a web page corresponding to "Pork" that is the word of K2 through the Internet 300.

Referring to FIG. 7, if the words such as "Korea's cultural assets" are input as search words, the words are connected like "한국의문화재+韓國文化財+

Cultural assets of Korea+韓國の文化財."

In this embodiment, the words are aligned in order of "Korean+Chinese characters+English+Japanese," but can be aligned in another order. Moreover, the other foreign languages can be added and aligned in a desired order. Therefore, foreign language chain 600 which is formed by aligning translated query words displayed without a special foreign language keyboard can be used as foreign language query words.

Referring to FIG. 8, if the words such as "Atomic number 77" are input on the search window using "Atomic number 77" as search words, the words are aligned in order of "원자번호
77+原子番號
77+Atomic number 77+이리듐+
Iridium." Here, web page search information does not exist in the drawing. However, this "Atomic number 77" is a targeted search result, but can be linked with home pages of companies which produce or sell provided materials, or enables a consistent and concentrative information search with respect to components of the materials or products produced using the produced components of the materials.

Referring to FIG. 9, if "Refrigerator" is input on the search window as a search word, "냉장고+冷藏庫+
Refrigerator+디오스
Dios+지펠
Zepel+클라세
KLASSE+딤체|
_Dimche" are sequentially displayed. That is, a number of connection domains can be provided in which introduction pages of goods of the companies are aligned.

Referring to FIG. 10, if "7294-08-0002-0" that is an ISBN number is input, a book entitled "Kyungbok palace history" corresponds to the ISBN number. Moreover, the relevant search words that correspond to "Kyungbok palace history" are arranged. The words are arranged order of "Kyungbok palace history+Kyungbok palace+Gwanghwamun citizen open yard+Seoul Chunggyechon+Jongro district office."

Referring to FIGS. 11A through 11D, web page connection information that corresponds to the search query word information source 500 are sequentially displayed in order of "한국의문화재+韓國文化財+
Cultural assets of Korea+韓國の文化財."

That is, FIGS. 11A through 11D illustrate that Korean, Chinese, English and Japanese sites are sequentially corresponded and loaded in the Ministry of Culture & Tourism in Republic of Korea.

Figure 12A:
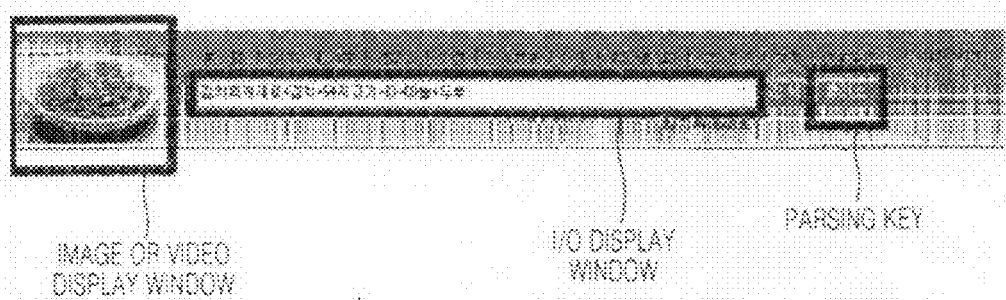
FIGS. 12A and 12B show a display screen illustrating an example of a screen of a web site searched and displayed by URL connection information included in the uppermost portion of the search query word information source when a language chain relating to "Kimchi pot stew materials" of FIG. 5 according to the present invention is input on an I/O display window, respectively.
Figure 12B:
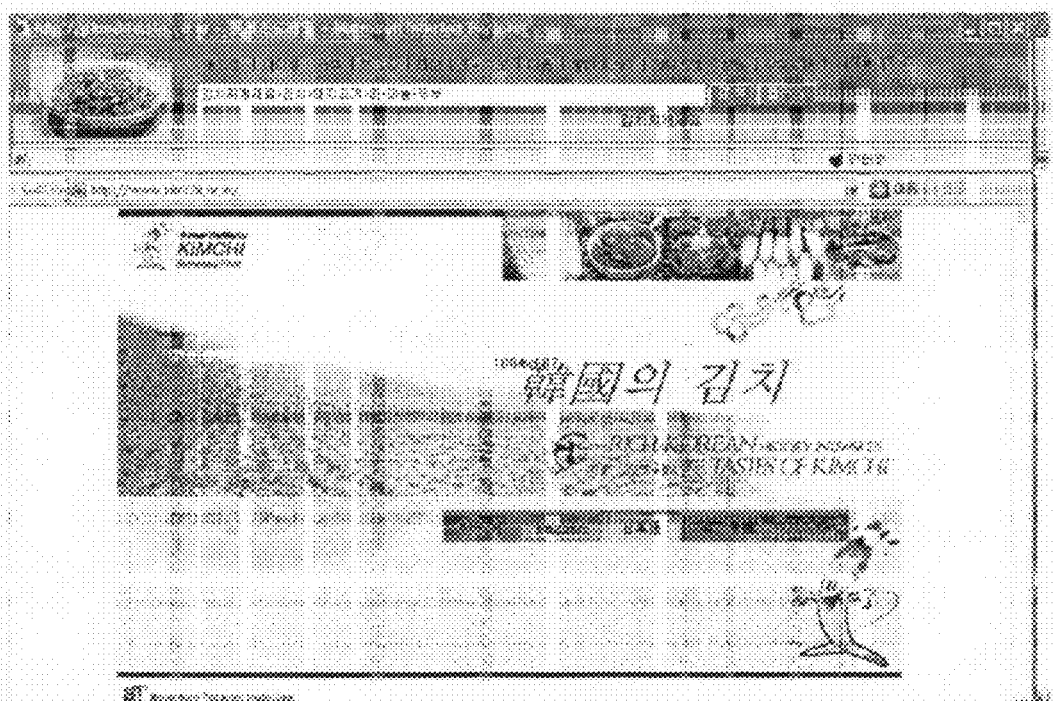

Referring to FIGS. 12A and 12b, if the words such as "Kimchi pot stew materials" are input on the I/O display window, and then a search button is depressed, "Kimchi pot stew material," "Kimchi," "Pork," "Green onion," "Garlic," and "Bean curd" which the words (K1, K2, K3, . . . , Kn) are displayed interposing at least one connector "+" therebetween.

Since the respective words (K1, K2, K3, . . . , Kn) are linked with the corresponding web sites like a HTML (hypertext markup language) link, the following word, that is, "Kimchi" comes out to the first place if a "PLUS" button is depressed, and "Kimchi pot stew materials" goes to the last place. If a relevant word is depressed with a mouse etc., a corresponding web site can be accessed. FIG. 12B illustrates a picture screen corresponding to "Kimchi pot stew materials."

Figure 13:
FIG. 13 shows a display screen illustrating an example of a screen of a web site including a title made of an ISBN code and page numbers of a published material example and words corresponding to the title, and an example of a screen moving to a corresponding web page according to an embodiment of the present invention.

Referring to FIG. 13, if an ISBN code corresponding to "Kyungbok palace history" is input in the I/O display window 800, a web address corresponding to the web page connection information of a book that corresponds to "Kyungbok palace history" is displayed, and the web address is configured to display the contents of the book.

Figure 14:
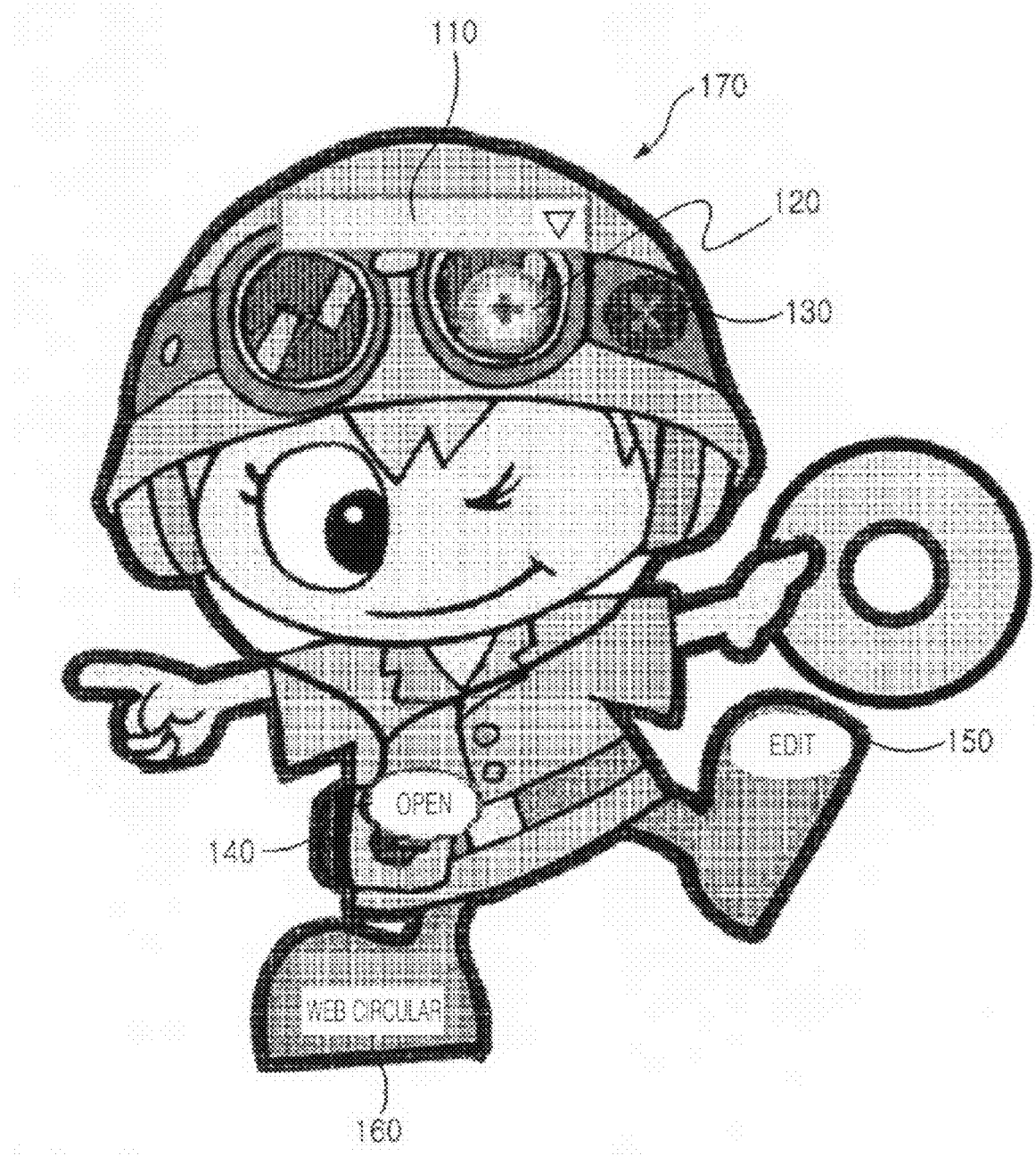
FIG. 14 is a diagram showing an I/O display window according to another embodiment of the present invention.

Referring to FIG. 14, a method of providing Internet search result information using a language chain which is configured in a character form according to another embodiment of the present invention is embodied in a program form. If query words are input in the query word input window 110 and the search button 120 is depressed, a search screen including the I/O display window 800 is loaded in correspondence to the query words, and the words (K1, K2, K3, . . . , Kn) involved with the query words are displayed on the I/O display window 800 correspondingly. A web site corresponding to the word located in the first place can be immediately accessed. Fox example, as described with reference to FIGS. 12A and 12B, when "Kimchi pot stew materials" is input, the web site that is displayed in FIG. 12B can be immediately accessed. In the case of wishing to end the character 170, a close button 130 is depressed to end.

A search word that corresponds to the relevant character 170 has been preset, if the right side arrow of the query word input window 110 is clicked. Fox example, "Newspaper," "Broadcasting," "Traffic," "National flag" etc., is aligned longitudinally. Here, if a corresponding query word is clicked, a corresponding web site can be immediately accessed. Fox example, if "Newspaper" is clicked, all kinds of newspapers issued in the inside and outside of the country are aligned in turn, so as to be displayed on the screen. However, in the case of wishing to search query words that the user has searched without searching the predetermined search words, an open button 140 is clicked to thus confirm a history that the user has searched beforehand or search the query words again corresponding to the corresponding history.

An edit button 150 can edit query words that are displayed on the query word input window 800. Fox example, if text documents of all forms are edited, the text documents can be read and edited.

A web circular button 160 is a button for immediately connecting to a web circular explained in FIGS. 3A and 3B. Thus, if part of the search engine is taken out as a character 170, and is installed on a main ground screen of a desktop computer, a desired web site can be immediately accessed. Fox example, in the case of the conventional art, a search engine is loaded and query words are input in the relevant search engine to find a desired web site. Otherwise, in the case that a desired web site is a frequently accessed web site, the corresponding web site can be loaded by clicking a favorite icon. However, when such a character 170 is used in the present invention, a desired web site can be immediately accessed, and desired web sites can be searched through various kinds of characters that enable a user to choose a group of words (K1, K2, . . . , Kn) of the search engine database 400 formed of a database as a title as well.

As described above, the present invention provides an effect of grasping information intuitively and enabling to directly access to a web page using web page connection information included in a word in which a conventional input display window is configured into an I/O display window so that if query words are input in the conventional input display window of the conventional search engine, the results about the query words and words 610, 620, and 630 included in the language chain, are also displayed.

In addition, the present invention provides an effect of displaying a foreign language chain aligned by translating query words displayed without a special foreign language keyboard to then use the foreign language query words immediately and gain access to a corresponding web site immediately.

In addition, the present invention provides an effect of performing a consistent and concentrative search work in which if elements of a material are searched, the home page of a company which produces or sells the relevant material can be accessed, web sites or dictionary web sites including information for the relevant material can be accessed, although a language chain in itself providing the elements of the material is a targeted search result.

In addition, the present invention provides an effect of providing a number of domains in which a language chain of goods including symbolic trademark name of the same products is configured to align home pages of companies which produce the same products or introduction pages of goods of companies which provide goods through a search query word information source.

Further, the present invention provides an effect of gaining access to a variety of web pages in which a language chain which is made of a number which is formed by mixing International Standard Book Number (ISBN) codes and page numbers of published materials as a title, extends the contents provided from the published materials and provides the supplemented materials irrespective of the meaning of the title, in order to supplement contents of describing electronic published materials and provide updated information.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

As described above, the present invention provides a method and apparatus for providing Internet search result information using a language chain, in order to retrieve data by directly gaining access to a web page in which words connected by at least one connector are displayed on an I/O (input/output) display window, picture or video information included in the words is displayed, and the web page is directly accessed using given connection information in order to provide results regarding query words input to perform a search work by a user.

What is claimed is:

1. A method of providing Internet search result information using a language chain, the method comprising the steps of:
   a user storing a title and data including a number of words and information to be included in the title in a search engine database, for storing a title, an image or view data, and relevant words and connection information directly in the search engine database through an I/O (input/output) display window of a web browser;
   when query words are received from the browser through the internet and a search button is pressed, detecting a title corresponding to the query words;
   detecting query word information with information of a plurality of words related to the title corresponding to the query words to thus produce a search query word information source, and displaying the title and the plurality of words of the information contained in the search query word information source on the I/O display window of the web browser through the Internet and the language chain the plurality of words being connected using a connector to form grouped words and each word of grouped words being listed horizontally and vertically;
   said language chain aligning a starting first word of the grouped words displayed on the I/O display window to be located after the last word on the I/O display window using a parsing key, or directly selecting one word of the grouped words displayed on the I/O display window to align at least one word displayed in front of the selected word to be located after the last word; and
   displaying an image or video information relevant with a first word of the aligned grouped words displayed on the I/O display window on an image or video display window or directly connecting a web site to be accessed through the Internet.

2. The method of providing Internet search result information using a language chain according to claim 1, wherein the information of the grouped words is sequentially stored in the search query word information source, in which URL or web page information is sequentially or selectively loaded into web page connection information in correspondence to the grouped words, and image information are also sequentially or selectively displayed in correspondence to the grouped words and the URL or web page information.

3. The method of providing Internet search result information using a language chain according to claim 2, wherein when book names or ISBN (International Standard Book Number) codes are input as the query words, the words including the ISBN codes and page numbers and images or web pages which are included in and collected from the search query word information source are displayed using the words involved with subject words by page of an electronic book, to then be immediately accessed to the electronic book or web page which is linked with the web page connection information.

4. The method of providing Internet search result information using a language chain according to claim 2, wherein the words are conveniently input as a number of foreign language inputs in which a number of foreign words corresponding to the words are enumerated, corresponding web page connection information are enumerated, and corresponding image information are enumerated.

5. The method of providing Internet search result information using a language chain according to claim 1, wherein in a web site providing the language chain I/O window, a user directly inputs and makes up the title, image or video data, an Internet page to be registered and then transmits the same through the Internet, to then input the title on the language chain I/O window so as to confirm the input.

6. The method of providing Internet search result information using a language chain according claim 1, wherein if the query words are input and the search button is pressed, a search screen including the I/O display window is loaded in correspondence to the query words and the words relevant with the query words are displayed on the I/O display window in correspondence to the loaded search screen, and performing a search work through a character including a query word input window and the search button through which a user can input predetermined query words.

7. The method of providing Internet search result information using a language chain according to claim 6, wherein the character further comprises:
   a web circular button which is configured to enable a user to load his or her own home page or desired picture in the search engine database;
   an open button which enables a history that is searched by a user to be displayed on the query word input window of the character; and
   an edit button which is configured to edit the query words displayed on the query word input window of the character.

* * * * *